United States Patent [19]

Hirabayashi et al.

[11] 4,258,136
[45] Mar. 24, 1981

[54] PROCESS FOR PRODUCING WOOD ADSORBENTS FOR MERCURY IONS BY GRAFT POLYMERIZATION OF ACROLEIN ONTO XANTHATED WOOD MEAL FOLLOWED BY CONVERSION TO THIOSEMICARBAZONE

[75] Inventors: Yasuhiko Hirabayashi, Tokyo; Toshihiro Murayama, Yokohama, both of Japan

[73] Assignee: Forestry and Forest Products Research Institute, Ministry of Agriculture, Forestry and Fisheries, Ibaragi, Japan

[21] Appl. No.: 16,792

[22] Filed: Mar. 2, 1979

[30] Foreign Application Priority Data

Nov. 18, 1976 [JP] Japan ................. 51-138665

[51] Int. Cl.³ .................. C02F 1/62; C08B 13/02; C08F 251/02; B01J 39/22
[52] U.S. Cl. ........................ 521/25; 521/30; 521/33; 260/17.4 GC
[58] Field of Search ............ 521/38, 25, 35, 33; 260/17.4 GC

[56] References Cited

U.S. PATENT DOCUMENTS 3,357,933  12/1967  Zaessinger et al. ......... 260/17.4 GC
4,003,701  1/1979  Brickman ................. 260/17.4 GC

FOREIGN PATENT DOCUMENTS 53-62790  6/1978  Japan .

OTHER PUBLICATIONS

"Recent Aspects of Grafting on Cellulose" Mark & Atlas pp. 342–345, Cellulose 3-(1969) Sep. 18, 1968, Chemistry a Technology.

Primary Examiner—Joseph L. Schofer
Assistant Examiner—Peter F. Kulkosky
Attorney, Agent, or Firm—Birch, Stewart, Kolasch & Birch

[57] ABSTRACT

A novel wood adsorbent for mercury ions is provided by the process of this invention. The process comprises xanthating an alkali wood meal, impregnating the xanthated wood meal with a solution of a peroxide, graft copolymerizing the product with acrolein in gas phase, and converting acrolein aldehyde groups on the resulting graft copolymer to thiosemicarbazone to obtain the novel wood adsorbent for mercury ion. The novel wood adsorbent has a great adsorbing capacity for mercury ion.

4 Claims, 1 Drawing Figure

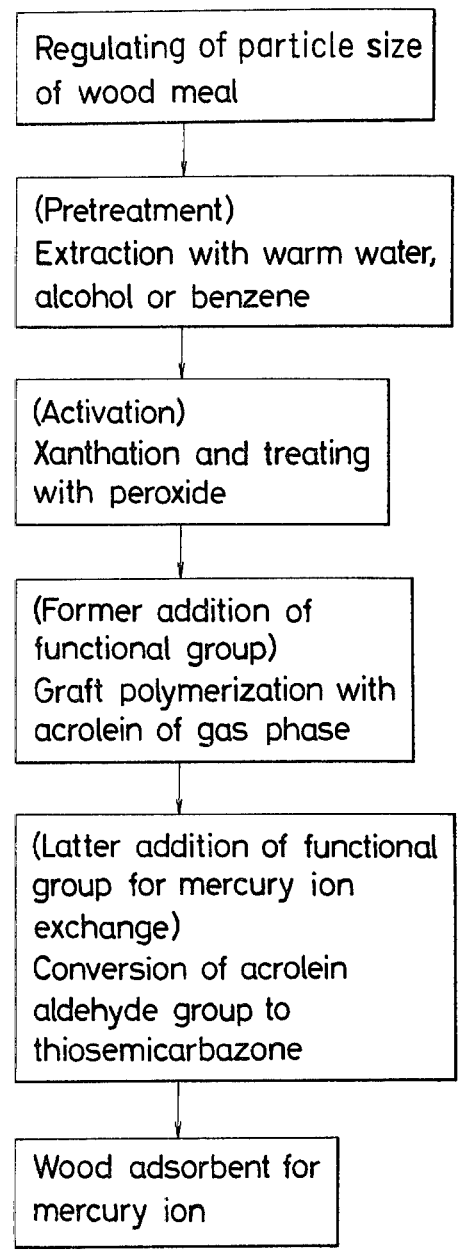

PROCESS FOR PRODUCING WOOD ADSORBENTS FOR MERCURY IONS BY GRAFT POLYMERIZATION OF ACROLEIN ONTO XANTHATED WOOD MEAL FOLLOWED BY CONVERSION TO THIOSEMICARBAZONE

BACKGROUND OF THE INVENTION

1. Field of the Invention

This invention relates to a process of producing an ion exchanger for adsorbing mercury ion and the like using wood materials. It is an object of this invention to provide processes for producing low-cost adsorbents which can remove mercury ion from waste water.

2. Summary of the Invention

According to this invention a process for producing an ion exchanger for adsorbing mercury ion includes the steps of impregnating a xanthated wood meal, which has been prepared by well-known methods with a peroxide polymerization initiator to produce active radicals thereon, graft copolymerizing said xanthated wood meal having active radicals with acrolein in gas phase under reduced, atmospheric or high pressure within an autoclave at a temperature of 20° C. to 70° C., preferably at 50° C., to introduce aldehyde groups, and then converting said aldehyde groups to thiosemicarbazone groups at ordinary temperature under atmospheric pressure to generate radicals capable of ion exchange.

One feature of the process according to this invention is that the graft copolymerization of acrolein proceeds at a high rate of reaction, and can be performed without danger as the reaction takes place at a low temperature. Another feature of this invention is that unreacted monomers can be easily recovered. An important characteristic of the ion exchangers obtained by the process according to this invention is the fact that they adsorb selectively mercury ion to be separated from other metal ions and the recovery of mercury ion can be easily performed. In addition, the production cost of the ion exchangers is characteristically low.

The particle size of starting wood meal is preliminarily regulated to have a particle size of 40 to 60 mesh, and then the wood meal is purified by a pretreatment involving extractions with warm water, alcohol, benzene or the like. However, such pretreatment can be omitted when certain starting materials are employed.

Generally the wood material is capable of limited swelling, and this property is maintained by the xanthated wood material used as the starting material in the present invention. The limited swelling property means that the material will not be disintegrated into single fibers and will maintain the original textural structure.

DETAILED DESCRIPTION OF THE INVENTION

The present invention will be described in details by referring to the attached drawing.

BRIEF EXPLANATION OF THE DRAWING

The present invention will become more fully understood from the detailed description given hereinbelow and the accompanying drawing which is given by way of illustration only, and thus are not limitative of the present invention.

The attached drawing shows the flow sheet of the process according to the present invention.

The particle size of the starting wood meal is preliminarily regulated and purified by a pretreatment extraction with warm water, alcohol, or benzene. The wood meal is xanthated and treated with a peroxide polymerization initiator followed by graft polymerization with acrolein in gas phase. The resulting aldehyde groups are converted to thiosemicarbozone groups to generate radicals capable of ion exchange to produce a wood adsorbent for mercury ions.

DESCRIPTION OF PREFERRED EMBODIMENTS

The following examples are set forth primarily for illustrating some embodiments of this invention.

It should be understood, however, that the specific examples, while indicating preferred embodiments of the invention, are given by way of illustration only, since various changes and modifications within the spirit and scope of the invention will become apparent to those skilled in the art. Any such changes and modifications are intended to be included within the scope of the present invention.

EXAMPLE 1

2.5 g of a wood meal of beech (40 to 60 mesh) are introduced in a beaker, and 50 ml of 3% NaOH solution are added thereto. After the mixture is maintained at 25° C. for one hour, the wood meal is filtered and is sucked until it weighs about 5 g. To this alkali wood meal are added dropwise 2 ml of carbon disulfide and the mixture is maintained at 25° C. for 2 hours to xanthate the wood meal. The xanthated wood meal is soaked in 50 ml of ice-cold aqueous 3.5% solution of hydrogen peroxide in a beaker for 15 to 30 minutes and then the product is filtered and sucked. The product is placed in a thimble of glass fiber having a diameter of 20 mm and a length of 90 mm. The thimble is suspended over 3 ml of acrolein within a glass autoclave equipped with an outlet valve. Said acrolein is cooled to a temperature of −35° C. to −40° C. and the pressure inside the autoclave is reduced to 20 mmHg. Then, the valve is closed. The autoclave with the valve closed is immersed in a thermostat maintained at 50° C. and the graft polymerization is allowed to proceed for 4 hours. A composite comprising mainly wood meal-acrolein copolymer is obtained. Then, the composite is placed in a beaker and is added with a solution of 10 g of sodium hydrogensulfite in 35 ml of water. After the mixture is heated at 60° C. for about 15 minutes and is cooled to room temperature, the product is filtered, washed with water, and dried. The wood meal treated with sodium hydrogensulfite is added to a solution consisting of 100 ml of water, 7 ml of glacial acetic acid and 3 g of thiosemicarbazide. After heating at 60° C. for 15 minutes, the mixture is maintained at room temperature for 4 hours for the conversion to thiosemicarbazone. The residual thiosemicarbazide is washed off with a solution consisting of 10 ml of glacial acetic acid and 300 ml of water. The resulting solid is washed with water, filtered with suction, dewatered and air-dried to obtain an ion exchanger.

EXAMPLE 2

10 g of a wood meal of beech (40 to 60 mesh) are placed in a beaker, and 100 ml of 5% NaOH solution are added thereto. After the mixture is kept at 25° C. for one hour, the wood meal is filtered and is sucked until it weighs about 20 g. The obtained alkali wood meal is transferred to a wide-mounted bottle and then is added dropwise with 4 ml of carbon disulfide. The mixture is maintained at 25° C. for 2 hours to carry on the xanthation of the wood meal. The residual carbon disulfide is removed by evaporation under reduced pressure. 100 ml of aqueous 3.5% solution of hydrogen peroxide are added to the xanthated product. The impregnation proceeds for about 30 minutes while the whole is kept in ice. Thereafter, the product wood meal is dewatered by suction until it weighs about 20 g. About 5 g thereof are placed in a thimble of glass fiber having a diameter of 20 mm and a length of 90 mm. The thimble is suspended over 3 ml of acrolein within a glass autoclave equipped with an outlet valve. The pressure inside the autoclave is reduced to 20 mmHg while said acrolein is cooled to a temperature of −35° C. to −40° C. Then, the valve is closed. The autoclave with the valve closed is immersed in a thermostat kept at 50° C. and the graft polymerization is allowed to proceed for 4 hours. A composite comprising mainly wood meal-acrolein copolymer is obtained. Then, the composite is introduced into a beaker and is added with an aqueous solution of thiosemicarbazide nitrate (consisting of 6 g of thiosemicarbazide and 150 ml of 1 nitric acid). The mixture is maintained at 25° C. for 24 hours for the conversion to thiosemicarbazone. The residual thiosemicarbazide is washed off with 1 N nitric acid. The resulting solid is washed with distilled water, dewatered by suction, and air-dried to obtain an ion exchanger.

EXAMPLE 3

2.5 g of a wood meal of beech (40 to 60 mesh) are placed in a beaker and 50 ml of 3% NaOH solution are added thereto. After the mixture is maintained at 25° C. for one hour, the wood meal is dewatered until it weighs about 5 g. The obtained alkali wood meal is transferred to a wide-mouthed bottle and then added dropwise with 1 ml of carbon disulfide. After the bottle is hermetically closed with a stopper, the xanthation of the alkali wood meal is carried on at 25° C. for 2 hours. Unreacted carbon disulfide is removed by evaporation under reduced pressure. The xanthated wood meal is washed with 500 ml of 0.1 N sulfuric acid and then with water (500 ml), and is dewatered. The obtained solid is soaked in 150 ml of aqueous 0.004% solution of ammonium iron (II) sulfate (Mohr's salt) for 10 minutes. Then, the solid is filtered, washed with water (500 ml), and dewatered. Thereafter, thus treated wood meal (about 5 g) is immersed in 100 ml of 3.5% $H_2O_2$ solution for 15 minutes, then filtered and dewatered. The product is placed in a thimble of glass fiber having a diameter of 20 mm and a length of 90 mm. The thimble is suspended over 3 ml of acrolein within a glass autoclave equipped with an outlet valve. The pressure inside the autoclave is reduced to 25 mmHg while said acrolein is cooled to a temperature of −35° C. to −40° C. Then, the valve is closed. The autoclave with the valve closed is immersed in a thermostat kept at 50° C. and the graft polymerization is allowed to carry on for 4 hours. A composite comprising mainly wood meal-acrolein copolymer is obtained. This composite is placed in a beaker and is added with an aqueous solution of sodium hydrogensulfite (10 g of sodium hydrogensulfite and 35 ml of water). After the mixture is heated at 80° C. for 15 minutes and cooled to room temperature (for one hour), the solid is filtered, washed with water (500 ml), and dewatered. Thereafter, thus treated solid is added with an aqueous solution of thiosemicarbazide (3 g of thiosemicarbazide in 100 ml of 1 N nitric acid). The mixture is heated at about 60° C. for 15 minutes and then is permitted to stand at 25° C. for 3 hours for the conversion to thiosemicarbazone. Then, unreacted thiosemicarbazide is completely removed by washing with 1 N nitric acid. The resulting solid is washed with distilled water, and air-dried to obtain an ion exchanger.

In the following Table 1, the adsorptivities of the wood ion exchangers prepared in accordance with this invention are compared with those of commercially available ion exchange resins.

TABLE 1

| Product | Punctional Group | Adsorption Capacity for Hg(II) ion (m mol/g) |
|---|---|---|
| Untreated wood meal of beech | — | 0.5 |
| Xanthated wood meal of beech | Xanthate group | 1.0 |
| Product of Example 1 | Thiosemicarbazone type | 2.3 |
| Product of Example 2 | Thiosemicarbazone type | 2.8 |
| Product of Example 3 | Thiosemicarbazone type | 3.9 |
| Diaion CR-10 (Commercially available) | Iminodiacetic acid type | 3.6 |
| Humus (Commercially available) | — | 2.3 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for producing a wood adsorbent for adsorbing mercury ions which compresses impregnating a xanthated wood meal with a peroxide polymerization initiator to produce active radicals thereon, graft polymerizing said xanthated wood meal with acrolein in a gas phase, and converting the acrolein aldehyde groups present to thiosemicarbazone groups capable of ion exchange.

2. The process according to claim 1 wherein said xanthated wood meal has particle size of 40 to 60 mesh.

3. A process according to claim 1, in which the xanthated wood meal is preliminarily treated by extraction with warm water, alcohol or benzene.

4. A process according to claim 1, in which the graft copolymerization is done at a temperature between 20° C. and 70° C.

* * * * *